United States Patent
Kang et al.

(10) Patent No.: US 10,152,254 B1
(45) Date of Patent: Dec. 11, 2018

(54) DISTRIBUTING MAPPED RAID DISK EXTENTS WHEN PROACTIVELY COPYING FROM AN EOL DISK

(71) Applicant: EMC IP Holding Company LLC, Hopkinton, MA (US)

(72) Inventors: Jamin Kang, Beijing (CN); Lili Chen, Hopkinton, MA (US); Jian Gao, Beijing (CN); Hongpo Gao, Beijing (CN); Geng Han, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/581,935

(22) Filed: Apr. 28, 2017

(51) Int. Cl.
   *G06F 3/06* (2006.01)
(52) U.S. Cl.
   CPC ............ *G06F 3/0619* (2013.01); *G06F 3/065* (2013.01); *G06F 3/0683* (2013.01)
(58) Field of Classification Search
   CPC .... G06F 3/0616; G06F 3/0619; G06F 3/0631; G06F 3/0644; G06F 3/0647; G06F 3/065; G06F 3/0683; G06F 3/0689
   USPC .................................. 711/114, 162; 714/6.3
   See application file for complete search history.

(56) References Cited

U.S. PATENT DOCUMENTS

| | | | | |
|---|---|---|---|---|
| 6,154,853 A | * | 11/2000 | Kedem | G06F 11/1084 711/114 |
| 9,256,381 B1 | * | 2/2016 | Fultz | G06F 3/0611 |
| 9,563,511 B1 | | 2/2017 | Foley et al. | |
| 9,690,660 B1 | | 6/2017 | Robins et al. | |
| 9,710,317 B2 | * | 7/2017 | Gupta | G06F 11/076 |
| 2017/0344431 A1 | * | 11/2017 | Coatney | G06F 11/1451 |
| 2018/0101452 A1 | * | 4/2018 | Blake | G06F 11/1438 |

OTHER PUBLICATIONS

Peter Puhov, et al.; "Virtual Drive Based Raid Groups," U.S. Appl. No. 15/393,859, filed Dec. 29, 2016.
Jian Gao, et al.; "Providing Raid-10 With a Configurable Raid Width Using a Mapped Raid Group," U.S. Appl. No. 15/499,546, filed Apr. 27, 2017.
Hongpo Gao, et al.; "Adjustable Error Sensitivity for Taking Disks Offline in a Mapped Raid Storage Array," U.S. Appl. No. 15/499,669, filed Apr. 27, 2017.
Jian Gao, et al.; "Disk Activity Balancing in Mapped Raid Storage Arrays by Data Remapping," U.S. Appl. No. 15/581,944, filed Apr. 28, 2017.

(Continued)

*Primary Examiner* — Gary J Portka
(74) *Attorney, Agent, or Firm* — BainwoodHuang (57) ABSTRACT

A method performed in a Mapped RAID system includes: (a) in response to a source disk (SD) reaching EOL status: (1) copying a first source disk extent (DE) (belonging to a first RAID extent) from the SD to a first spare DE on a first destination disk and (2) copying a second source DE from the SD to a second spare DE (belonging to a second RAID extent) on a second destination disk, (b) in response to completely copying the first source DE from the SD to the first spare DE, mapping the first spare DE to belong to the first RAID extent in place of the first source DE, and (c) in response to completely copying the second source DE from the SD to the second spare DE, mapping the second spare DE to belong to the second RAID extent in place of the second source DE.

20 Claims, 4 Drawing Sheets

(56) References Cited

OTHER PUBLICATIONS

Shaoqin Gong, et al.; "Disk Extent Rebalancing in Mapped Raid Storage Arrays," U.S. Appl. No. 15/495,240, filed Apr. 24, 2017.
Jian Gao, et al.; "Splitting a Group of Physical Data Storage Drives Into Partnership Groups to Limit the Risk of Data Loss During Drive Rebuilds in a Mapped Raid (Redundant Array of Independent Disks) Data Storage System," U.S. Appl. No. 15/497,984, filed Apr. 26, 2017.
Jian Gao, et al.; "Reducing Concurrency Bottlenecks While Rebuilding a Failed Drive in a Data Storage System," U.S. Appl. No. 15/498,609, filed Apr. 27, 2017.
Robert P. Foley, et al.; "Repairing Raid Systems At Per-Stripe Granularity," U.S. Appl. No. 15/499,102, filed Apr. 27, 2017.
Nickolay Alexandrovich Dalmatov; "Re-Placing Data Within a Mapped-Raid Environment," International Patent Application Serial No. PCT/RU2017/000273, filed Apr. 27, 2017.

* cited by examiner

DISTRIBUTING MAPPED RAID DISK EXTENTS WHEN PROACTIVELY COPYING FROM AN EOL DISK

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Many conventional data storage appliances use RAID (redundant array of independent disks) technology to store large volumes of data across numerous physical storage drives without requiring user machines to address each individual disk. RAID systems also frequently store data redundantly so data can be recovered if one or more storage drives fail unexpectedly.

Some data storage appliances using RAID technology include spare storage drives which are reserved as "hot spares" in case one or more storage drives fail. In the event of a drive failure, the system can be "rebuilt" by reconstructing data from the failed drive using data from the remaining drives and then writing the recovered data to a spare drive. Once all the recovered data has been written to the spare drive, the system can continue normal operation.

SUMMARY

Unfortunately, conventional data storage appliances using RAID may experience performance limitations. Upon failure of a drive, performing a rebuild of the system requires reading data from the remaining drives and copying the reconstructed data to a spare drive which may have limited write performance. The speed of rebuilding the system will be bottlenecked by the maximum write throughput for writing the reconstructed data to the spare drive as well as the read throughputs of the remaining drives. The system is vulnerable to permanent data loss if an additional drive fails before the rebuild process is completed.

The speed of the rebuild process can be improved by employing a ProActive COpy (PACO) mechanism. Using PACO, when a drive is deemed likely to fail imminently, its data can be proactively copied to a hot spare drive without needing to invoke the slow rebuild process.

However, performance is still limited by the maximum write throughput for writing the reconstructed data to the hot spare drive. In addition, while data is being proactively copied, extensive metadata must be recorded to ensure that the copy process proceeds correctly. This can introduce significant overhead, particularly when I/O is still being directed at the drive during PACO. Thus, it would be desirable to increase the performance of PACO even further to avoid the overhead associated with the metadata and to be able to utilize the full read bandwidth of the failing drive, which is typically faster than the write bandwidth.

Such improvements can be achieved using specialized mapped RAID techniques. In mapped RAID, the system distributes data across RAID extents which are made up of disk extents. The disk extents of each RAID extent are provided by different physical storage drives. In improved techniques, instead of performing PACO onto hot spare drives, when a drive is deemed likely to fail imminently, PACO proceeds by copying individual disk extents of that drive onto spare disk extents distributed over several physical storage drives. Because each disk extent can be copied separately, much less metadata is needed, reducing the overhead. In addition, several disk extents can be copied to different destination disks in parallel, eliminating the write bandwidth as a bottleneck; instead, the bottleneck is the read speed of the source drive, which is typically faster than the write bandwidth. Also, since once each disk extent is proactively copied, its RAID extent can be remapped to the new disk extent on the new disk, less I/O will be directed at the drive during PACO, further reducing overhead.

In one embodiment, a method of proactively responding to an imminent failure within a set of disks arranged in a Mapped RAID (Redundant Array of Independent Disks) configuration is performed by a data storage system apparatus. The method includes (a) in response to receiving a notification that a source disk of the set of disks has reached an end-of-life (EOL) status, the EOL status indicating that the source disk is still functional but is likely to fail imminently: (1) copying a first source disk extent from the source disk to a first spare disk extent on a first destination disk, the first source disk extent belonging to a first RAID extent and (2) copying a second source disk extent from the source disk to a second spare disk extent on a second destination disk, the second source disk extent belonging to a second RAID extent distinct from the first RAID extent, (b) in response to completely copying the first source disk extent from the source disk to the first spare disk extent, mapping the first spare disk extent on the first destination disk to belong to the first RAID extent in place of the first source disk extent, and (c) in response to completely copying the second source disk extent from the source disk to the second spare disk extent, mapping the second spare disk extent on the second destination disk to belong to the second RAID extent in place of the second source disk extent. The first source disk extent is distinct from the second source disk extent. The source disk, the first destination disk, and the second destination disk are all distinct members of the set of disks. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments are directed to techniques for increasing the performance of proactive copy (PACO) operations to avoid the overhead associated with the metadata and to be able to utilize the full read bandwidth of the failing drive, which is typically faster than the write bandwidth.

Figure 1:
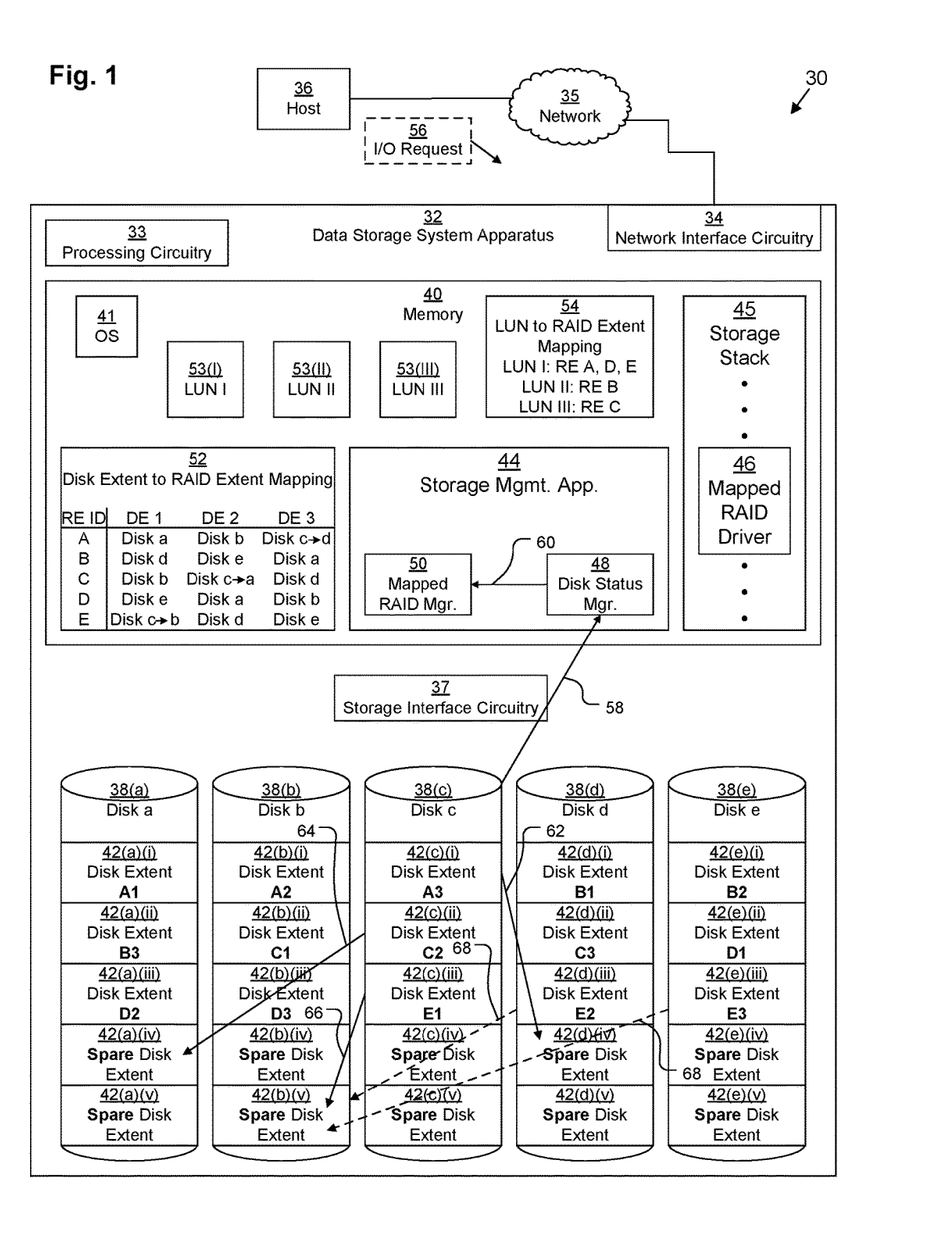
FIG. 1 is a block diagram depicting an example system and apparatus for use in connection with various embodiments.

FIG. 1 shows an example environment 30 in which embodiments of the improved techniques hereof can be practiced. Here, one or more host computing devices ("hosts") 36 access a data storage system (DSS) apparatus 32 over a network 35. DSS 32 may be may be any kind of computing device, such as, for example, a personal computer, workstation, server computer, enterprise server, DSS rack server, laptop computer, tablet computes, smart phone, mobile computer, etc. Typically, computing device 32 is a DSS rack server, such as, for example, a VMAX® series enterprise data storage system or a VNX® series data storage system provided by Dell EMC of Hopkinton, Mass. DSS 32 is typically housed in one or more storage cabinets (not depicted). However, in some embodiments, DSS 32 may be a dispersed system operating across a network.

DSS 32 includes processing circuitry 33, network interface circuitry 34, storage interface circuitry 37, persistent data storage disks 38 (depicted as disks 38(a), 38(b), 38(c), 38(d), and 38(d)), and memory 40. DSS 32 may also include other components as are well-known in the art, including interconnection circuitry.

Processing circuitry 33 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 34 may include one or more Ethernet cards, cellular modems, Fibre Channel (FC) adapters, Wireless Fidelity (Wi-Fi) wireless networking adapters, and/or other devices for connecting to network 35. The network 35 may be any type of network or combination of networks, such as a storage area network (SAN), a local area network (LAN), a wide area network (WAN), the Internet, and/or some other type of network or combination of networks, for example. The host 36 may connect to the DSS 32 using various technologies, such as Fibre Channel, iSCSI, NFS, SMB 3.0, and CIFS, for example. Any number of hosts 36 may be provided, using any of the above protocols, some subset thereof, or other protocols besides those mentioned. A host 36 may be any kind of computing device configured to operate on a network, such as, for example, personal computers, workstations, server computers, enterprise servers, laptop computers, tablet computers, smart phones, mobile computers, etc. or combinations thereof. Typically, a host 36 is a server computer or an enterprise server.

Disks 38 may include any kind of persistent storage devices, such as, for example, hard disk drives, solid-state storage devices, flash drives, etc. Storage interface circuitry 37 controls and provides access to persistent storage drives 38. Storage interface circuitry 37 may include, for example, SCSI, Serial-Attached-SCSI (SAS), ATA, SATA, FC, and/or other similar controllers and ports. Disks 38 may be arranged into one or more pools (not depicted), each of which includes a set of disks 38. As depicted in FIG. 1, DSS 30 includes one pool, which includes exactly five disks 38(a), 38(b), 38(c), 38(d), 38(e). It should be understood that the depicted configuration is by way of example only; there may be more than one pool, and each pool may have fewer than or more than five disks 38.

In some embodiments, processing circuitry 33, network interface circuitry 34, memory 40, and storage interface circuitry 37 may all be mounted on a single board or circuit board assembly (not depicted) that plugs into a chassis (not depicted), known as a storage processor (SP). There may be more than one SP installed in DSS 32 for redundancy and performance reasons.

Memory 40 may be any kind of digital system memory, such as, for example, random access memory (RAM). Memory 40 stores one or more operating system (OS) 41 in operation (e.g., Linux, UNIX, Windows, MacOS, or a similar operating system), various applications executing on processing circuitry 33, and application data. For example, memory 40 stores various drivers (of which only Mapped RAID driver 46 is depicted) of a storage stack 45 and storage management application 44 which execute on processing circuitry 33, as well as data used by those applications and drivers including mappings 52, 54 and representations of logical storage units (LUNs, also known as logical disks).

In some embodiments, memory 40 may also include a persistent storage portion (not depicted). Persistent storage portion of memory 40 may be made up of one or more persistent storage devices, such as, for example, disks. Persistent storage portion of memory 40 or disks 38 may be configured to store programs and data even while the DSS 32 is powered off. The OS 41 and the applications and drivers (e.g., 44, 46) are typically stored in this persistent storage portion of memory 40 or on disks 38 so that they may be loaded into a system portion of memory 40 from this persistent storage portion of memory 40 or disks 38 upon a system restart. These applications and drivers (e.g., 44, 46) when stored in non-transient form either in the volatile portion of memory 40 or on disks 38 or in persistent portion of memory 40, form a computer program product. The processing circuitry 33 running one or more of these applications or drivers (e.g., 44, 46) thus forms a specialized circuit constructed and arranged to carry out the various processes described herein.

Storage management application 44 executes to manage a storage configuration of DSS 32. For example, storage management application 44 may include a disk status manager 48 and a mapped RAID (redundant array of independent disks) manager 50, which also execute on processing circuitry 33. Disk status manager 48 operates to keep track of which disks 38 are currently in proper working order and which disks 38 are in danger of failing or have already failed. Mapped RAID manager operates to manage an assignment of disk extents (DEs) 42 on disks 38 to RAID extents (REs) according to mapping 52 and to manage an assignment of REs to LUNs 53 according to mapping 54.

The pool of disks 38, as depicted, has a Mapped RAID configuration. As depicted, the pool is configured in a RAID-5 configuration, with each RE being made up of three DEs 42, each from a different disk 38 from the pool. A typical DE 42 may have a capacity of four gigabytes, for example. As depicted in DE to RE mapping 52, there are five REs distributed across the five disks 38 of the pool. As depicted in DE to RE mapping 52, RE B has a first DE (also referred to as B1) on disk 38(d), a second DE (also referred to as B2) on disk 38(e), and a third DE (also referred to as B3) on disk 38(*a*), for example. Looking at the disks 38 in detail, any given disk 38(*x*) stores five DEs 42(*x*)(*i*)-(*v*), and DE 42(*d*)(*i*) stores B1 for RE B, DE 42(*e*)(*i*) stores B2 for RE B, and DE 42(*a*)(*ii*) stores B3 for RE B. Thus, RE B is distributed across storage drives 38(*d*), 38(*e*), and 38(*a*). The configuration of the remaining REs A, C, D, and E is also depicted within FIG. 1 similarly.

There are also several spare disk extents 42 provisioned on disks 38, which are not yet assigned to any RE. For example, DEs 42(*a*)(*iv*), 42(*a*)(*v*), 42(*b*)(*iv*), 42(*b*)(*v*), 42(*c*)(*iv*), 42(*c*)(*v*), 42(*d*)(*iv*), 42(*d*)(*v*), 42(*e*)(*iv*), and 42(*e*)(*v*) are initially all provisioned as spares.

LUNs 53 are made up of one or more REs as defined by LUN to RE Mapping 54. Thus, as depicted, LUN 53(I) is made up of REs A, D, and E, while LUN 53(II) is made up of just RE B, and LUN 53(III) is made up of just RE C.

It should be understood that the REs are shown containing three DEs 42 for purposes of illustration. However, an RE need not contain exactly three DEs 42 and, in various embodiments, may contain any number of DEs. It should also be understood that an RE may be implemented as a data structure (not depicted) representing a set of relations between logical block addresses and DEs 42. While FIG. 1 shows five REs distributed across five disks 38, this is by way of example only. It should be understood that pool may have any numbers of disks 38 and REs. In addition, each disk 38 may have any number of DEs 42, although, often each disk 38 had the same number of DEs as every other disk 38 in the pool.

In some embodiments, an RE must not contain more than one DE 42 from any one of the disks 38 (i.e., each DE 42 in an RE must be provided by a different disk 38 from each of the other DEs 42 in that RE). Further, in some arrangements, each RE must contain a specific number of DEs. For example, some embodiments may implement RAID-5 and require exactly five DEs 42 in each RE. Other embodiments may implement RAID-5 with exactly eight DEs 42 in each RE. Still other arrangements may implement other RAID configurations, such as RAID-6, or RAID-10, and require various other numbers of DEs 42 in each RE. Furthermore, some embodiments may implement various combinations of RAID configurations.

DSS 32 is configured to receive I/O requests 56 from hosts 36 over network 35 and to respond to such I/O requests 56 by reading from or writing to the persistent storage disks 38 using drivers arranged in storage stack 45, including mapped RAID driver 46, which may translate logical block addresses within a LUN 53 involved in the I/O request 56 into physical addresses on particular disks 38 as defined by mappings 52, 54.

As depicted in FIG. 1, during operation of DSS 32, disk status manager 48 receives an indication 58 that disk 38(*c*) is likely to fail imminently. This indication 58 may take the form of a communication failure or one or more media errors for I/Os directed at disk 38(*c*). In response, disk status manager 48 assigns an end-of-life (EOL) status to disk 38(*c*) and sends a notification 60 of this EOL status to Mapped RAID manager 50. In response, Mapped RAID manager 50 initiates a ProActive Copy Operation (PACO) on disk 38(*c*). Disk status determination and PACO are described in additional detail in U.S. patent application Ser. No. 15/499,669, entitled "ADJUSTABLE ERROR SENSITIVITY FOR TAKING DISKS OFFLINE IN A MAPPED RAID STORAGE ARRAY" and filed on Apr. 27, 2017, the entire contents and teachings of which are incorporated herein by this reference.

During the PACO of disk 38(*c*), Mapped RAID manager 50 copies (or attempts to copy) each non-empty DE 42(*c*)(*i*), 42(*c*)(*ii*), 42(*c*)(*iii*) from disk 38(*c*) to a spare disk extent 42 on another eligible disk 38. There may be various rules for determining which other disks 38 are eligible. See, for example, U.S. patent application Ser. No. 14/729,714 entitled "SPARE SELECTION IN A DECLUSTERED RAID SYSTEM" and filed on Jun. 3, 2015, the entire contents and teachings of which are incorporated herein by this reference. In one embodiment, any disk 38 that does not already store another DE 42 belonging to the same RE as a DE 42 being copied from the EOL disk 38(*c*) is eligible to receive that DE 42. For example, since DE 42(*c*)(*i*) belongs to RE A, it cannot be copied to disks 38(*a*) or 38(*b*), but it can be copied to either disk 38(*d*) or 38(*e*). Similarly, since DE 42(*c*)(*ii*) belongs to RE C, it cannot be copied to disks 38(*b*) or 38(*d*), but it can be copied to either disk 38(*a*) or 38(*e*). Similarly, since DE 42(*c*)(*iii*) belongs to RE E, it cannot be copied to disks 38(*d*) or 38(*e*), but it can be copied to either disk 38(*a*) or 38(*b*).

As depicted, Mapped RAID manager 50 copies DE 42(*c*)(*i*) to DE 42(*d*)(*iv*) in step 62, DE 42(*c*)(*ii*) to DE 42(*a*)(*iv*) in step 64, and DE 42(*c*)(*iii*) to DE 42(*b*)(*v*) in step 66. In some embodiments, only a limited number of DEs 42 can be copied using PACO at a time for performance reasons. Thus, for example, in one embodiment, only two DEs 42 may be copied under PACO at a time (e.g., if the write speed of a disk 38 is approximately half of the read speed). Thus, for example, Mapped RAID manager 50 may cause steps 62 and 64 to be performed in parallel, only initiating step 66 upon completing one of steps 62, 64.

In some embodiments, instead of Mapped RAID manager 50 performing the PACO of each DE 42, a dedicated process assigned uniquely to each respective LUN 53 may perform one PACO for a DE 42 assigned to an RE assigned to that LUN 53 at a time. This serves to determine which DEs 42 can be copied simultaneously to ensure that not too many execute in parallel. In addition, this arrangement allows the PACO to be implemented using legacy RAID drivers. As depicted, since DEs 42(*c*)(*i*) and 42(*c*)(*iii*) both belong to LUN 53(I) (since DE 42(*c*)(*i*) belongs to RE A and DE 42(*c*)(*iii*) belongs to RE E and both REs A and E belong to LUN 53(I)), steps 62 and 66 cannot be executed in parallel, but steps 62 and 64 can be executed in parallel.

During PACO of any given DE 42(*c*)(*x*), that DE 42(*c*)(*x*) is in a distressed state, and any I/O request 56 that necessitates writing to that DE 42(*c*)(*x*) may be treated specially. If the I/O request 56 is a read request, it will be executed by reading from that DE 42(*c*)(*x*) while it is being copied. However, if the I/O request 56 is a write request, it will be executed by writing to both that DE 42(*c*)(*x*) while it is being copied and to the spare DE 42 to which it is being copied. Either of these situations (and particularly the write case) results in a slowdown of the PACO for that DE 42(*c*)(*x*). The I/O requests 56 themselves also experience above-average latency in these cases.

Once the PACO of each DE 42 completes, however, the spare DE to which it was written becomes mapped to the RE to which the DE 42(*c*)(*x*) from which it was copied used to belong, and that DE 42(*c*)(*x*) is no longer mapped to that RE. Thus, for example, after step 62 completes, the third DE 42 of RE A (designated A3 for short) moves from DE 42(*c*)(*i*) to DE 42(*d*)(*iv*), as indicated by the one of the arrows within DE to RE mapping 52. If an I/O request 56 then comes in directed to A3, it will be fulfilled in a non-degraded manner by reading from or writing to the newly-mapped DE 42(*d*)(*iv*).

Similarly, if an I/O request comes in directed to E1, which is originally stored on DE $42(c)(iii)$, if step 66 has not yet begin, then it will be fulfilled in a non-degraded manner by reading from or writing to the original DE $42(c)(iii)$.

In some embodiments, during the PACO of a particular DE 42, e.g., DE $42(c)(iv)$, a problem may arise causing the PACO step 66 to abort. For example, if PACO step 66 takes too long to complete or if I/O requests 56 directed to that DE $42(c)(iv)$ experience latencies that are significantly longer than usual or if too many errors are experienced in reading from or writing to that DE $42(c)(iv)$, then the PACO step may terminate and that DE $42(c)(iv)$ is then marked as dead, in which case it may be rebuilt in step 68 from the remaining DEs $42(d)(iii)$ (representing E2), $42(e)(iii)$ (representing E3) of the RE E to which that DE $42(c)(iv)$ (representing E1) belongs using well-known parity-based rebuilding techniques, for example.

Figure 2:
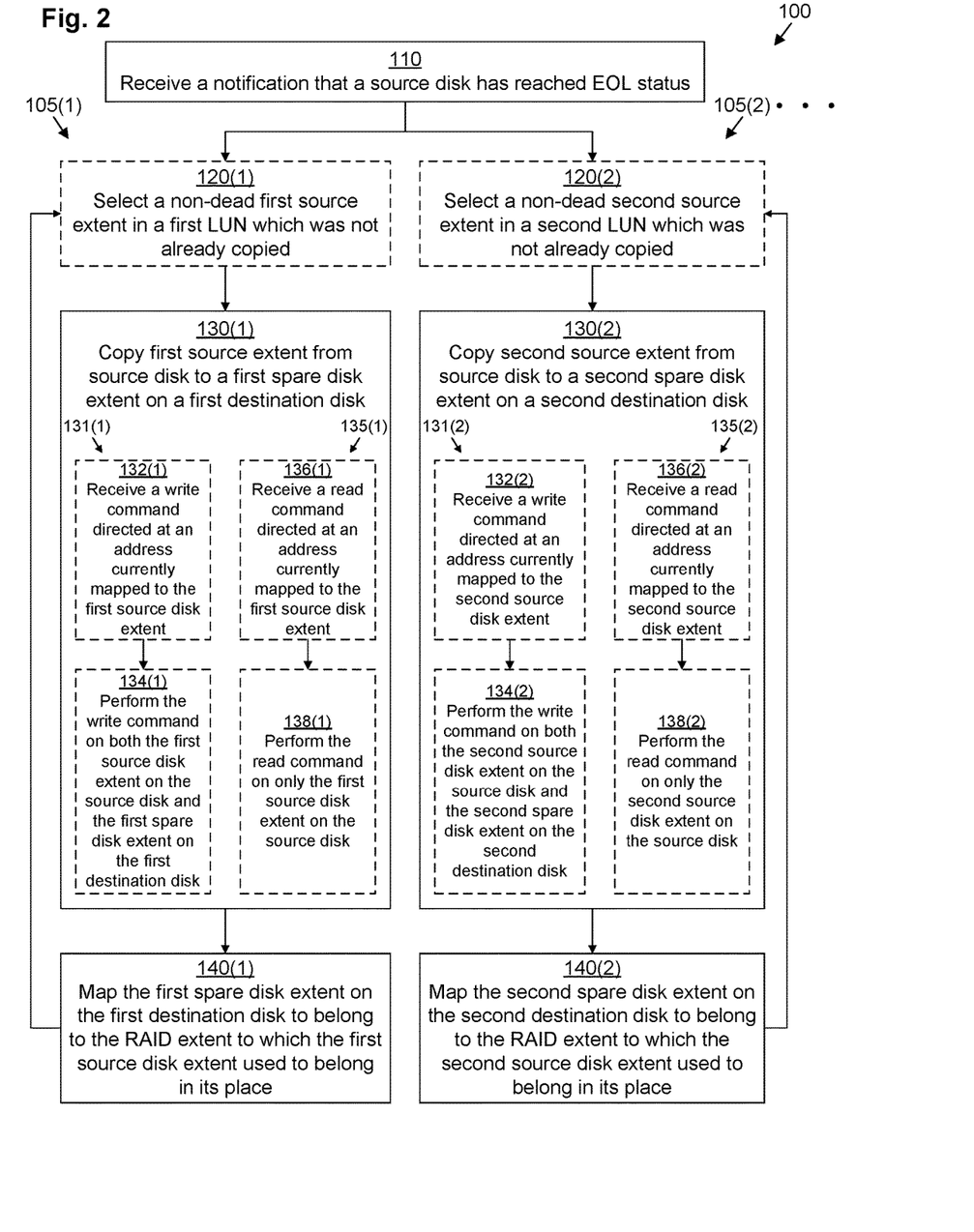
FIG. 2 is a flowchart depicting example methods of various embodiments.

FIG. 2 illustrates an example method 100 performed by storage management application 44 for responding to an EOL situation. It should be understood that any time a piece of software (e.g., storage management application 44, disk status manager 48, Mapped RAID manager 50, storage stack 45, mapped RAID driver 46, OS 41, etc.) is described as performing a method, process, step, or function, in actuality what is meant is that a computing device (e.g., DSS 32) on which that piece of software is running performs the method, process, step, or function when executing that piece of software on its processing circuitry 33. It should be understood that, within FIG. 2 steps 120(1), 120(2) are drawn with a dashed border because they it may be considered optional or ancillary, depending on the embodiment. In addition, sub-steps 132(1), 132(2), 134(1), 134(2), 136(1), 136(2), 138(1), and 138(2) are drawn with dashed borders because they represent various situations which might occur during execution of method 100. In addition, one or more of the other steps or sub-steps of method 100 may be omitted in some embodiments. Similarly, in some embodiments, one or more steps or sub-steps may be combined together or performed in a different order. Method 100 is performed by DSS 32. More specifically, method 100 is performed by storage management application 44 running on DSS 32 in combination with other components of DSS 32 and its sub-components 48, 50 (especially Mapped RAID manager 50).

In step 110, Mapped RAID manager 50 receives a notification 60 that a disk 38 (e.g., disk 38(c)) has been designated EOL. In response, Mapped RAID manager 50 initiates two or more processes 105 (designated as processes 105(1), 105(2), . . . ) to perform PACO on the DEs $42(c)(x)$ of that disk $38(c)$. In some embodiments, Mapped RAID manager 50 performs processes 105 itself, while, in other embodiments, Mapped RAID manager 50 causes these processes 105 to begin in other components running on DSS 32 (e.g., within RAID management instances associated with each respective LUN 53, not depicted, typically operating as part of storage management application 44). Each process 105(1), 105(2), . . . is the same, so although process 105(1) is shown as having steps 120(1), 130(1), 140(1) (and various sub-steps), and process 105(2) is shown as having steps 120(2), 130(2), 140(2) (and various sub-steps), the steps and sub-steps will be described herein without the process number attached (e.g., as steps 120, 130, 140 and sub-steps 132, 134, 136, 138).

Step 120 is depicted as optional because, in some embodiments, the selection is performed trivially, while, in other embodiments, it may be actively performed.

In step 120, storage management application 44 selects a first DE $42(c)(x_1)$ on the EOL disk $38(c)$ which has not yet been copied as a source. In some embodiments, storage management application 44 first makes sure that the selected DE $42(c)(x_1)$ has not been marked as dead. In addition, storage management application 44 does not select any spare DEs 42 from the EOL disk $38(c)$.

In step 130, storage management application 44 copies the selected first DE $42(c)(x_1)$ onto a respective spare DE 42 on another disk 38 which is eligible to receive it (e.g., the other disk 38 does not already have another DE 42 that belongs to the same RE as the selected first DE $42(c)(x_1)$. In some embodiments, the spare DE 42 is selected from an eligible disk 38 that happens to currently be experiencing a below-average I/O volume. This is beneficial because it reduces the likelihood that the copy process will be slowed down due to the disk 38 on which the spare 42 is located being busy.

While step 130 is being performed, processes 131 and/or 135 may perform in parallel. Processes 131, 135 are typically performed by storage stack 45 (including Mapped RAID driver 46). Each process 131, 135 may be performed any number of times while step 130 executes.

Process 131 begins with sub-step 132, in which storage stack 45 receives an I/O request 56 that encodes a write command (or another command that makes a change, such as a create command) directed at an address currently mapped to the first DE $42(c)(x_1)$. In response, in sub-step 134, storage stack 45 performs the write command on both the first DE $42(c)(x_1)$ and on the spare DE 42 that it is being copied to.

Process 135 begins with sub-step 136, in which storage stack 45 receives an I/O request 56 that encodes a read command directed at an address currently mapped to the first DE $42(c)(x_1)$. In response, in sub-step 138, storage stack 45 performs the read command on only the first DE $42(c)(x_1)$ but not on the spare DE 42 that it is being copied to.

After step 130 completes, in step 140, Mapped RAID manager 50 maps the spare DE 42 that the first DE $42(c)(x_1)$ was just copied to as belonging to the RE to which the first DE $42(c)(x_1)$ belonged in its place (so the first DE $42(c)(x_1)$ no longer belongs to that RE), e.g., by making a change within the DE to RE mapping 52 as shown in FIG. 1.

At this point, process 105 may be performed again, this time on a new DE $42(c)(x_2)$ instead.

Processes 105(1), 105(2), . . . perform in parallel until all non-spare non-dead DEs $42(c)(x)$ on the EOL disk $38(c)$ have been copied successfully and are no longer mapped to any RE.

In parallel with method 100, storage management application 44 also similarly initiates rebuild operations on dead extents $42(c)(x)$ on the EOL disk $38(c)$. In some embodiments, process 105 for some DEs $42(c)(x)$ may be replaced with method 300 described below in connection with FIG. 4.

Figure 3:
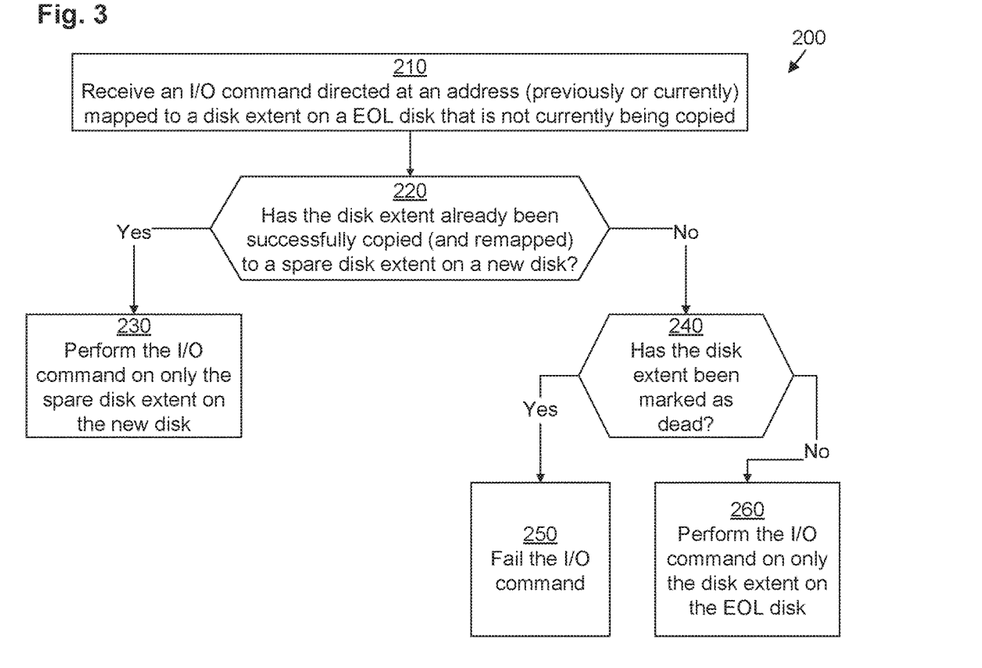
FIG. 3 is a flowchart depicting example methods of various embodiments.

FIG. 3 illustrates an example method 200 performed by storage stack 45. It should be understood that one or more of the steps of method 200 may be omitted in some embodiments. Similarly, in some embodiments, one or more steps may be combined together or performed in a different order. Method 200 is performed by DSS computing device 30. More specifically, method 200 is performed by storage stack 45 and its constituent drivers running on DSS 32 in combination with other components of DSS 32. Method 200 is performed in parallel with method 100, while storage management application 44 is performing PACO on an EOL disk $38(c)$.

In step 210, storage stack 45 receives an I/O request 56 (e.g., a read or write command) directed at an address currently mapped to a DE 42(c)(x) on the EOL disk 38(c) which is not currently in the middle of being copied (e.g., that particular DE 42(c)(x) may have either already been copied or it may not yet have been copied). The same I/O request 56 may also be directed at other DEs 42 that are not on the EOL drive 38(c)—the performance of the I/O request 56 with respect to those targets is not significantly impacted by PACO, so it is not discussed herein.

In response, in step 220, upon the I/O request 56 propagating down the storage stack 45 to the Mapped RAID driver 46, Mapped RAID driver 46 may determine whether or not the DE 42(c)(x) to which the I/O request 56 was directed has already been successfully copied to a spare DE 42, in which case, Mapped RAID driver 46 sends the I/O request 56 down the storage stack 45 for performance on the spare DE 42 which was newly-mapped to the RE of the DE 42(c)(x) to which the I/O request 56 was directed.

In some embodiments, step 220 may not be explicitly performed because the I/O request 56 is already aimed at the spare DE 42.

When step 220 yields a negative answer, operation proceeds with step 240. In step 240, Mapped RAID driver 46 may determine whether or not the DE 42(c)(x) to which the I/O request 56 was directed has been marked as dead. If so, Mapped RAID driver 46 fails the I/O command in step 250, since that DE 42(c)(x) is currently in the process of being rebuilt and is not currently-available. Otherwise, in step 260, Mapped RAID driver 46 sends the I/O request 56 down the storage stack 45 for performance on the DE 42(c)(x) to which the I/O request 56 was directed.

Figure 4:
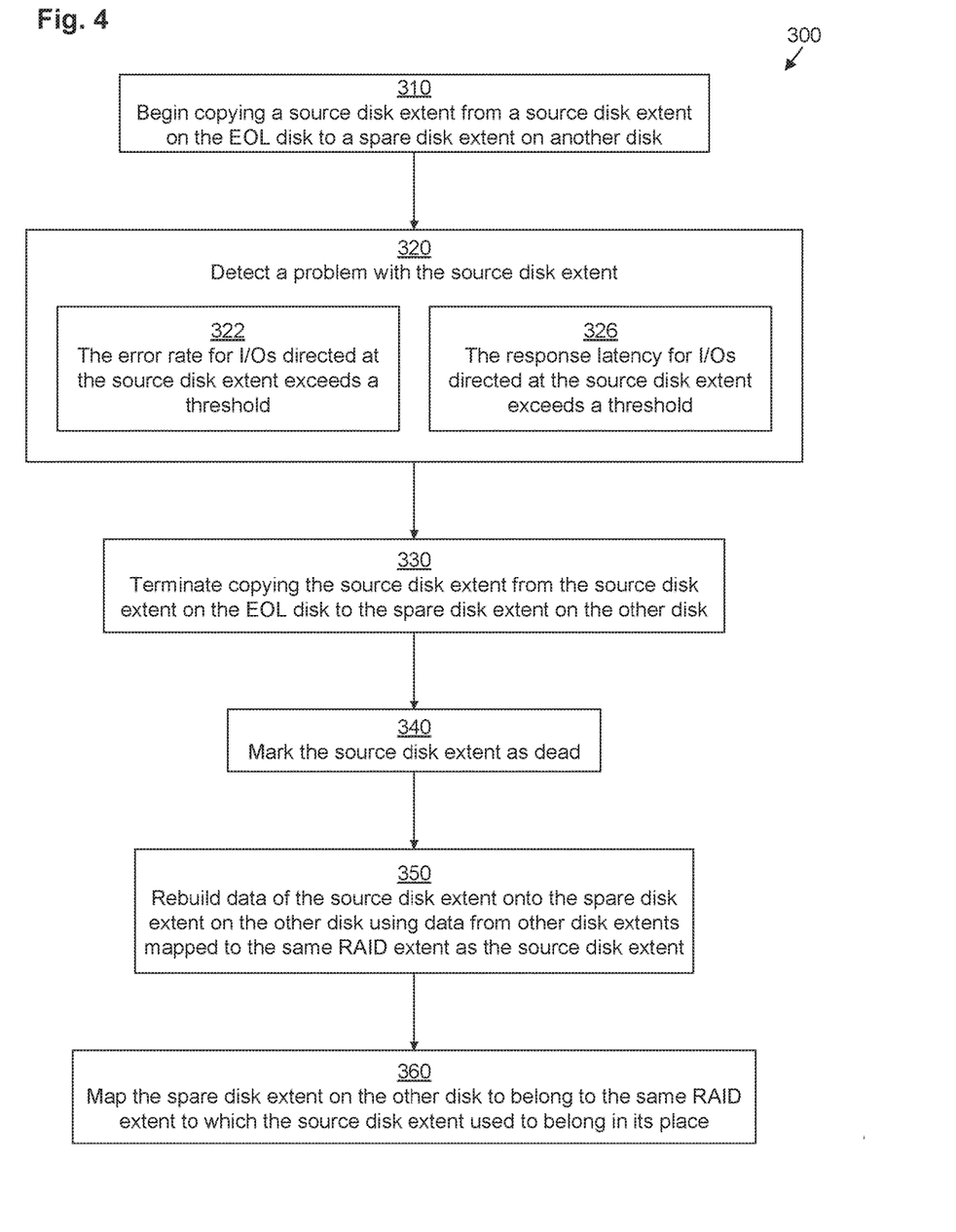
FIG. 4 is a flowchart depicting example methods of various embodiments.

FIG. 4 illustrates an example method 300 performed by storage management application 44. It should be understood that one or more of the steps of method 300 may be omitted in some embodiments. Similarly, in some embodiments, one or more steps may be combined together or performed in a different order. Method 300 is performed by DSS computing device 30. More specifically, method 300 is performed by storage management application 44 and its constituent parts running on DSS 32 in combination with other components of DSS 32. Method 300 is performed in parallel with processes 105 from method 100.

Under certain conditions, instead of process 105 proceeding to step 130 for a particular DE 42(c)(x), operation proceeds with method 300. In truth, steps 320-360 of method 300 may alternatively be deemed to be an interruption to the copying of step 130 in the event that step 320 occurs.

In step 310, storage management application 44 begins copying a particular DE 42(c)(x) from EOL disk 38(c) onto a spare extent 42 on another disk 38 just like in step 130. However, in step 320, storage management application 44 detects that there is a problem with the particular DE 42(c)(x) that prevents the copying from proceeding. Step 320 may be performed when disk status manager 48 performs one of sub-steps 322, 326.

In sub-step 322, disk status manager 48 determines that an error rate for I/O requests 56 or other I/Os that are directed at the particular DE 42(c)(x) exceeds a threshold. For example, if more than two errors are detected per minute, sub-step 322 is triggered. This means that it is likely that there is corruption on the particular DE 42(c)(x).

Alternatively, in sub-step 326, disk status manager 48 determines that a response latency for I/O requests 56 or other I/Os that are directed at the particular DE 42(c)(x) exceeds a threshold. For example, if the response latency triples over the normal response latency for I/O requests directed at the particular DE 42(c)(x) under normal conditions, sub-step 326 is triggered. This means that the combination of PACO and the parallel I/O requests 56 is overwhelming the ability of the DSS 32 to compensate. Such delay is dangerous because it may be slowing down the PACO, and it is important that PACO completes as quickly as possible to avoid the possibility of data loss.

Upon performing sub-step 322 or 326, disk status manager 48 may send a notification 60 to Mapped RAID manager 50 as part of step 320.

In response to step 320, in step 330, storage management application 44 terminates copying the particular DE 42(c)(x) from EOL disk 38(c) onto spare extent 42. In step 340, storage management application 44 marks the particular DE 42(c)(x) as dead.

In step 350, storage management application 44 causes a rebuild process 68 to occur to rebuild the data of the particular DE 42(c)(x) onto the spare extent 42 of an appropriate disk 38 instead of PACO according to well-known techniques for performing RAID rebuild.

Finally, in step 360, after the rebuild has completed, Mapped RAID manager 50 maps the spare DE 42 that the DE 42(c)(x) was just rebuilt onto as belonging to the RE to which the DE 42(c)(x) belonged in its place (so the DE 42(c)(x) no longer belongs to that RE), e.g., by making a change within the DE to RE mapping 52 as shown in FIG. 1.

Thus, techniques have been presented for increasing the performance of PACO operations to avoid the overhead associated with the metadata and to be able to utilize the full read bandwidth of the EOL drive 38(c), which is typically faster than the write bandwidth. Experiments were performed on a standard PACO implementation in comparison with an improved implementation described herein.

An experiment was performed on a DSS 32 having between thirteen and sixteen disks 38 in a pool configured in a Mapped RAID arrangement organized into 4+1 RAID-5 REs, each RE having four data DEs and one parity DE (for a total of five DEs per RE). Each disk 38 was a 550-gigabyte (GB) Nearline SAS having a maximum transfer rate of 12 GB/s. Each DE 42 was 32 GB in size.

Using a traditional PACO implementation, the PACO was able to proceed on an EOL disk 38(c) at approximately 88.8 megabytes (MB) per second when no I/O requests 56 were simultaneously aimed at the EOL disk 38(c). This is slower than the maximum sustained sequential write speed of the disks 38 of about 120 MB/s. However when sixteen threads issuing random I/O requests 56 (with 8 threads issuing reads and 8 threads issuing writes) were aimed at the EOL disk 38(c), performance decreased to just 8.55 MB/s.

However, using an improved implementation as described herein, the PACO was able to proceed on an EOL disk 38(c) at approximately 160 megabytes (MB) per second when no I/O requests 56 were simultaneously aimed at the EOL disk 38(c). This is significantly faster than the maximum sustained sequential write speed of the disks 38 of about 120 MB/s, and it is close to the maximum sustained sequential read speed of the disks 38. When sixteen threads issuing random I/O requests 56 (with 8 threads issuing reads and 8 threads issuing writes) were aimed at the EOL disk 38(c), performance only decreased to about 80 to 100 MB/s, which is an order of magnitude better than the traditional implementation. In addition, as the number of disks 38 in the pool increased, the rate at which the I/O requests 56 could be completed increased. Thus, with thirteen disks 38 in the pool, 581 I/O requests 56 could be completed per second, increasing to 669 I/O requests 56 per second for sixteen disks 38 in the pool.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by a data storage system apparatus of proactively responding to an imminent failure within a set of disks arranged in a Mapped RAID (Redundant Array of Independent Disks) configuration, the method comprising:
    in response to receiving a notification that a source disk of the set of disks has reached an end-of-life (EOL) status, the EOL status indicating that the source disk is still functional but is likely to fail imminently:
        copying a first source disk extent from the source disk to a first spare disk extent on a first destination disk, the first source disk extent belonging to a first RAID extent; and
        copying a second source disk extent from the source disk to a second spare disk extent on a second destination disk, the second source disk extent belonging to a second RAID extent distinct from the first RAID extent, wherein:
            the first source disk extent is distinct from the second source disk extent, and
            the source disk, the first destination disk, and the second destination disk are distinct members of the set of disks;
    in response to completely copying the first source disk extent from the source disk to the first spare disk extent, mapping the first spare disk extent on the first destination disk to belong to the first RAID extent in place of the first source disk extent; and
    in response to completely copying the second source disk extent from the source disk to the second spare disk extent, mapping the second spare disk extent on the second destination disk to belong to the second RAID extent in place of the second source disk extent.

2. The method of claim 1 wherein copying the first source disk extent from the source disk to the first spare disk extent on the first destination disk is performed in parallel with copying the second source disk extent from the source disk to the second spare disk extent on the second destination disk.

3. The method of claim 1 wherein the method further comprises, while copying the first source disk extent from the source disk to the first spare disk extent on the first destination disk:
    receiving a write command directed at an address of the first RAID extent currently mapped to the first source disk extent; and
    in response to receiving the write command, performing the write command on both the first source disk extent on the source disk and the first spare disk extent on the first destination disk.

4. The method of claim 3 wherein the method further comprises, while copying the first source disk extent from the source disk to the first spare disk extent on the first destination disk:
    receiving a read command directed at another address of the first RAID extent currently mapped to the first source disk extent; and
    in response to receiving the read command, performing the read command on only the first source disk extent on the source disk.

5. The method of claim 3 wherein the method further comprises, after mapping the first spare disk extent on the first destination disk to belong to the first RAID extent in place of the first source disk extent:
    receiving a data storage command directed at an address of the first RAID extent which was previously mapped to the first source disk extent; and
    in response to receiving the data storage command, performing the data storage command on only the first spare disk extent on the first destination disk.

6. The method of claim 1 wherein the method further comprises, in response to receiving the notification that the source disk has reached the EOL status, selecting, as the first destination disk, a disk of the set of disks which is currently experiencing a below average volume of storage commands.

7. The method of claim 1 wherein the method further comprises, after mapping the first spare disk extent on the first destination disk to belong to the first RAID extent in place of the first source disk extent:

beginning to copy a third source disk extent from the source disk to a third spare disk extent on a third destination disk, the third source disk extent belonging to a third RAID extent;
while copying the third source disk extent from the source disk to the third spare disk extent on the third destination disk, detecting that a response time for data storage commands directed at the third source disk extent has exceeded a threshold;
in response to detecting that the response time for data storage commands directed at the third source disk extent has exceeded the threshold:
  terminating copying the third source disk extent from the source disk to the third spare disk extent on the third destination disk;
  marking the third source disk extent as having failed;
  using data from other disk extents mapped to the third RAID extent, rebuilding data of the third source disk extent onto the third spare disk extent on the third destination disk; and
  in response to completely rebuilding the data of the third source disk extent onto the third spare disk extent on the third destination disk, mapping the third spare disk extent on the third destination disk to belong to the third RAID extent in place of the third source disk extent.

8. The method of claim 1 wherein the method further comprises, after mapping the first spare disk extent on the first destination disk to belong to the first RAID extent in place of the first source disk extent:
  beginning to copy a third source disk extent from the source disk to a third spare disk extent on a third destination disk, the third source disk extent belonging to a third RAID extent;
  while copying the third source disk extent from the source disk to the third spare disk extent on the third destination disk, detecting that an error count for data storage commands directed at the third source disk extent has exceeded a threshold;
  in response to detecting that the error count for data storage commands directed at the third source disk extent has exceeded the threshold:
    terminating copying the third source disk extent from the source disk to the third spare disk extent on the third destination disk;
    marking the third source disk extent as having failed;
    using data from other disk extents mapped to the third RAID extent, rebuilding data of the third source disk extent onto the third spare disk extent on the third destination disk; and
    in response to completely rebuilding the data of the third source disk extent onto the third spare disk extent on the third destination disk, mapping the third spare disk extent on the third destination disk to belong to the third RAID extent in place of the third source disk extent.

9. An apparatus comprising:
  a set of disks arranged in a Mapped RAID (Redundant Array of Independent Disks) configuration; and
  processing circuitry coupled to memory configured to proactively respond to an imminent failure within the set of disks by:
    in response to receiving a notification that a source disk of the set of disks has reached an end-of-life (EOL) status, the EOL status indicating that the source disk is still functional but is likely to fail imminently:
      copying a first source disk extent from the source disk to a first spare disk extent on a first destination disk, the first source disk extent belonging to a first RAID extent; and
      copying a second source disk extent from the source disk to a second spare disk extent on a second destination disk, the second source disk extent belonging to a second RAID extent distinct from the first RAID extent, wherein:
        the first source disk extent is distinct from the second source disk extent, and
        the source disk, the first destination disk, and the second destination disk are distinct members of the set of disks;
    in response to completely copying the first source disk extent from the source disk to the first spare disk extent, mapping the first spare disk extent on the first destination disk to belong to the first RAID extent in place of the first source disk extent; and
    in response to completely copying the second source disk extent from the source disk to the second spare disk extent, mapping the second spare disk extent on the second destination disk to belong to the second RAID extent in place of the second source disk extent.

10. A computer program product comprising a non-transitory computer-readable storage medium storing a set of instructions, which, when executed by a data storage system (DSS) computing device, causes the DSS computing device to proactively respond to an imminent failure within a set of disks arranged in a Mapped RAID (Redundant Array of Independent Disks) configuration by:
  in response to receiving a notification that a source disk of the set of disks has reached an end-of-life (EOL) status, the EOL status indicating that the source disk is still functional but is likely to fail imminently:
    copying a first source disk extent from the source disk to a first spare disk extent on a first destination disk, the first source disk extent belonging to a first RAID extent; and
    copying a second source disk extent from the source disk to a second spare disk extent on a second destination disk, the second source disk extent belonging to a second RAID extent distinct from the first RAID extent, wherein:
      the first source disk extent is distinct from the second source disk extent, and
      the source disk, the first destination disk, and the second destination disk are distinct members of the set of disks;
  in response to completely copying the first source disk extent from the source disk to the first spare disk extent, mapping the first spare disk extent on the first destination disk to belong to the first RAID extent in place of the first source disk extent; and
  in response to completely copying the second source disk extent from the source disk to the second spare disk extent, mapping the second spare disk extent on the second destination disk to belong to the second RAID extent in place of the second source disk extent.

11. The computer program product of claim 10 wherein copying the first source disk extent from the source disk to the first spare disk extent on the first destination disk is performed in parallel with copying the second source disk extent from the source disk to the second spare disk extent on the second destination disk.

12. The computer program product of claim 10 wherein the set of instructions, when executed by the DSS computing device, further cause the DSS computing device to, while copying the first source disk extent from the source disk to the first spare disk extent on the first destination disk:
  receive a write command directed at an address of the first RAID extent currently mapped to the first source disk extent; and
  in response to receiving the write command, perform the write command on both the first source disk extent on the source disk and the first spare disk extent on the first destination disk.

13. The computer program product of claim 12 wherein the set of instructions, when executed by the DSS computing device, further cause the DSS computing device to, while copying the first source disk extent from the source disk to the first spare disk extent on the first destination disk:
  receive a read command directed at another address of the first RAID extent currently mapped to the first source disk extent; and
  in response to receiving the read command, perform the read command on only the first source disk extent on the source disk.

14. The computer program product of claim 12 wherein the set of instructions, when executed by the DSS computing device, further cause the DSS computing device to, after mapping the first spare disk extent on the first destination disk to belong to the first RAID extent in place of the first source disk extent:
  receive a data storage command directed at an address of the first RAID extent which was previously mapped to the first source disk extent; and
  in response to receiving the data storage command, perform the data storage command on only the first spare disk extent on the first destination disk.

15. The computer program product of claim 10 wherein the set of instructions, when executed by the DSS computing device, further cause the DSS computing device to, in response to receiving the notification that the source disk has reached the EOL status, select, as the first destination disk, a disk of the set of disks which is currently experiencing a below average volume of storage commands.

16. The computer program product of claim 10 wherein the set of instructions, when executed by the DSS computing device, further cause the DSS computing device to, after mapping the first spare disk extent on the first destination disk to belong to the first RAID extent in place of the first source disk extent:
  begin to copy a third source disk extent from the source disk to a third spare disk extent on a third destination disk, the third source disk extent belonging to a third RAID extent;
  while copying the third source disk extent from the source disk to the third spare disk extent on the third destination disk, detect that a response time for data storage commands directed at the third source disk extent has exceeded a threshold;
  in response to detecting that the response time for data storage commands directed at the third source disk extent has exceeded the threshold:
    terminate copying the third source disk extent from the source disk to the third spare disk extent on the third destination disk;
    mark the third source disk extent as having failed;
    using data from other disk extents mapped to the third RAID extent, rebuild data of the third source disk extent onto the third spare disk extent on the third destination disk; and
    in response to completely rebuilding the data of the third source disk extent onto the third spare disk extent on the third destination disk, map the third spare disk extent on the third destination disk to belong to the third RAID extent in place of the third source disk extent.

17. The computer program product of claim 10 wherein the set of instructions, when executed by the DSS computing device, further cause the DSS computing device to, after mapping the first spare disk extent on the first destination disk to belong to the first RAID extent in place of the first source disk extent:
  begin to copy a third source disk extent from the source disk to a third spare disk extent on a third destination disk, the third source disk extent belonging to a third RAID extent;
  while copying the third source disk extent from the source disk to the third spare disk extent on the third destination disk, detect that an error count for data storage commands directed at the third source disk extent has exceeded a threshold;
  in response to detecting that the error count for data storage commands directed at the third source disk extent has exceeded the threshold:
    terminate copying the third source disk extent from the source disk to the third spare disk extent on the third destination disk;
    mark the third source disk extent as having failed;
    using data from other disk extents mapped to the third RAID extent, rebuild data of the third source disk extent onto the third spare disk extent on the third destination disk; and
    in response to completely rebuilding the data of the third source disk extent onto the third spare disk extent on the third destination disk, map the third spare disk extent on the third destination disk to belong to the third RAID extent in place of the third source disk extent.

18. The method of claim 1 wherein:
  the first RAID extent is initially configured according to a first RAID level; and
  in response to mapping the first spare disk extent on the first destination disk to belong to the first RAID extent in place of the first source disk extent, the first RAID extent remains configured according to the first RAID level.

19. The method of claim 1 wherein:
  copying the first source disk extent from the source disk to the first spare disk extent on the first destination disk is performed to the exclusion of copying the first source disk extent to any other disk of the set of disks aside from the first destination disk; and
  copying the second source disk extent from the source disk to the second spare disk extent on the second destination disk is performed to the exclusion of copying the second source disk extent to any other disk of the set of disks aside from the second destination disk.

20. The method of claim 1 wherein the method further comprises:
  selecting the first destination disk by choosing, as the first destination disk, a disk of the set of disks that does not already contain a disk extent belonging to the first RAID extent prior to copying the first source disk extent from the source disk to the first spare disk extent on the first destination disk; and selecting the second destination disk by choosing, as the second destination disk, a disk of the set of disks that does not already contain a disk extent belonging to the second RAID extent prior to copying the second source disk extent from the source disk to the second spare disk extent on the second destination disk.

* * * * *